United States Patent [19]

Toth

[11] 4,079,231
[45] Mar. 14, 1978

[54] TOUCHWORK SYSTEM FOR A MIG ARC WELDING APPARATUS

[75] Inventor: Tibor E. Toth, Florence, S.C.

[73] Assignee: Union Carbide Corporation, New York, N.Y.

[21] Appl. No.: 672,076

[22] Filed: Mar. 30, 1976

[51] Int. Cl.$^2$ .............................................. B23K 9/10
[52] U.S. Cl. ............................... 219/130.32; 219/136; 219/137.71
[58] Field of Search .................. 219/130, 131 F, 69 S, 219/136; 307/117

[56] References Cited

U.S. PATENT DOCUMENTS

| | | | |
|---|---|---|---|
| 3,024,353 | 3/1962 | Brashear, Sr. | 219/131 F |
| 3,603,846 | 9/1971 | Toth | 219/69 S |
| 3,627,977 | 12/1971 | Aldenhoff | 219/131 F |
| 3,886,369 | 5/1975 | Porter | 307/117 |

Primary Examiner—J. V. Truhe
Assistant Examiner—Clifford C. Shaw
Attorney, Agent, or Firm—John R. Doherty

[57] ABSTRACT

A touchwork system for use in conjunction with a MIG arc welding apparatus comprising a sensing circuit operating at very low output voltages, e.g. 6–8 volts, which senses the touch of the consumable wire electrode to the workpiece when the welding process is started. A control circuit energizes the welding contactor in response to a signal from the sensing circuit and turns on the power supply. At the same time, the control circuit starts the wire feeder motor and also the flow of shielding gas to the torch. A detector circuit detects the flow of welding current and feeds a signal to the control circuit to keep the welding contactor energized and the power supply in circuit and also to maintain operation of the wire feeder motor and the flow of shielding gas to the torch.

4 Claims, 2 Drawing Figures

TOUCHWORK SYSTEM FOR A MIG ARC WELDING APPARATUS

BACKGROUND

In consumable metal inert gas (MIG) arc welding, a consumable wire electrode is continuously fed by a wire feeder to the welding torch from a supply roll. The consumable wire electrode passes through the torch and feeds out through a contact tip a short distance which is called "stick out". In order to start the welding process, the operator presses a switch on the torch which energizes the welding contactor and turns on the power supply. At the same time, the motor for operating the wire feeder is started and the shielding gas begins to flow to the torch. The consumable wire electrode is touched to the workpiece which initiates the arc and the operator begins to weld. However, the operator must continue to hold the switch in the closed position while carrying out the welding operation. This can be rather awkward for the operator if he is going to weld for long periods. Another disadvantage of this conventional system is that the switch adds to the cost of the welding equipment and also frequently requires replacement.

So-called "touchwork systems" for automatically starting the welding operation when the consumable wire electrode touches the workpiece are known in the art. Such systems usually employ means for maintaining the welding contactor energized during the welding operation and thus avoid the disadvantages of the torch switch. However, in these systems, when the operator stops welding, the welding contactor remains energized and the operator may be exposed to the hazards of high voltages from the power supply.

Another problem that is frequently encountered in MIG arc welding using a touchwork system is that when the operator touches the consumable wire electrode to the workpiece, the wire stick out may blow off due to the high surge current that develops when the arc is first struck. This "blow-off" can be an aggravating problem since the operator must go back to the wire feeder and manually feed wire through the torch until enough stick out is present to make a fresh start.

SUMMARY

The present invention is directed to an improved touchwork system for use in conjunction with a MIG arc welding apparatus which automatically opens the welding contactor when the operator stops welding and which is therefore safe and does not expose the operator when not welding to the hazards of high voltages.

Broadly, the improved touchwork system of the present invention comprises a sensing circuit operating at very low output voltages, e.g. 6-8 volts, which senses the touch of the consumable wire electrode to the workpiece when the welding process is started. A control circuit energizes the welding contactor in response to a signal from the sensing circuit and turns on the power supply. At the same time, the control circuit starts the wire feeder motor and also the flow of shielding gas to the torch. A detector circuit detects the flow of welding current and feeds a signal to the control circuit to keep the welding contactor energized and the power supply in circuit and also to maintain operation of the wire feeder motor and the flow of shielding gas to the torch.

To terminate the welding operation, the operator removes the consumable wire electrode from the workpiece which breaks the arc. With no welding current flowing in the circuit, the welding contactor opens which then turns off the power supply. The control circuit also stops operation of the wire feeder motor and the flow of shielding gas to the torch.

A significant feature of the present invention is the provision of an improved touchwork system which further includes means for automatically feeding the consumable wire electrode through the torch contact tip after the occurrence of wire blow-off during start up of the apparatus.

DESCRIPTION OF THE PREFERRED EMBODIMENTS

Figure 1:
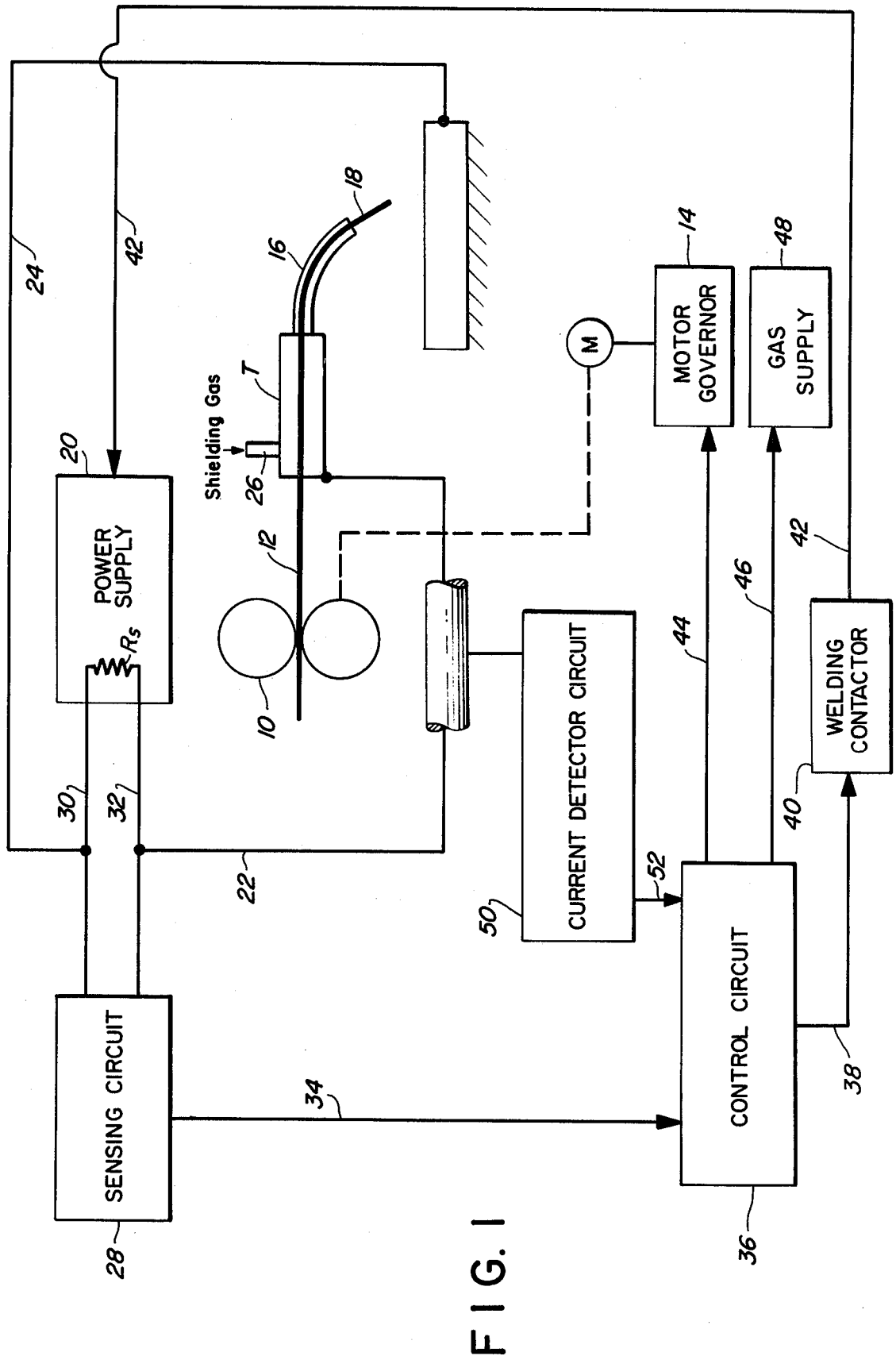
FIG. 1 is a schematic representation of a MIG arc welding apparatus and a touchwork system in accordance with the present invention.

Referring now to the drawing and particularly to FIG. 1, there is shown a MIG arc welding apparatus which includes a torch T and wire feeder rolls 10 which feed a consumable wire 12 to the torch T from a suitable supply (not shown). The wire feeder rolls 10 are driven by a motor M whose speed is controlled by a motor governor 14. The consumable wire 12 passes through the contact tip 16 of torch T and feeds out a short distance to provide a wire "stick out" as shown at 18. A DC power supply 20 is provided and has its output terminals connected by cable leads 22, 24 across the torch T and the workpiece W. Shielding gas is fed from a suitable supply to the gas inlet 26 on torch T and also emerges from the contact tip 16 to shield the arc which is established between the consumable wire 12 and the workpiece W.

A sensing circuit 28 is also provided and has its output connected by leads 30, 32 across the cable leads 22, 24 from the power supply 20. As shown in this embodiment of the present invention, a resistor $R_s$ is incorporated in the power supply 20. However, power supplies not equipped with the shunt resistor $R_s$ may be used equally as well in the practice of the present invention. Sensing circuit 28 provides a low voltage output signal which appears across the shunt resistor $R_s$ and also across the consumable wire 12 and the workpiece W. The output signal from the sensing circuit 28 is of very low voltage, e.g. about 6-8 volts in the case where $R_s$ is in the circuit or about 10 volts when $R_s$ is not employed. This low voltage output signal is not of sufficient magnitude to present any hazard to the operator.

To begin the welding process, the operator touches the end of the consumable wire 12 against the workpiece W. This results in an instantaneous short circuit across both the power supply 20 and the sensing circuit 28. The sensing circuit 28 immediately produces an output signal 34 which is fed to a control circuit 36. The control circuit 36 produces in turn an output signal 38 which energizes the welding contactor 40. The welding contactor 40 produces a signal 42 which turns on the power supply 20.

With the power supply 20 turned on, an arc is immediately established between the consumable wire 12 and the workpiece W. Also in response to signal 34, the control circuit 36 feeds a signal 44 to the motor governor 14 which starts the wire feeder motor M. The control circuit 36 also feeds a signal 46 to the gas supply 48 which begins the flow of shielding gas to the torch T.

When the arc is established between the consumable wire 12 and the workpiece W, the output signal 34 from the sensing circuit 28 terminates. However, the flow of welding current through the cable lead 22 is immediately sensed by a current detector circuit 50. This circuit 50 is connected to a part of the cable lead 22, this part being shown in greatly enlarged detail for purposes of illustration. The detector circuit 50 produces in turn an output signal 52 which is fed to the control circuit 36. Control circuit 36 in response to this output signal continues to maintain the signal 38 to the welding contactor 40 which keeps the power supply 20 in circuit and also maintains the signal 44 to motor governor 14 and the signal 46 to the gas supply 48. Thus the wire feeder motor M continues to operate and the flow of shielding gas to the torch T is maintained.

Figure 2:
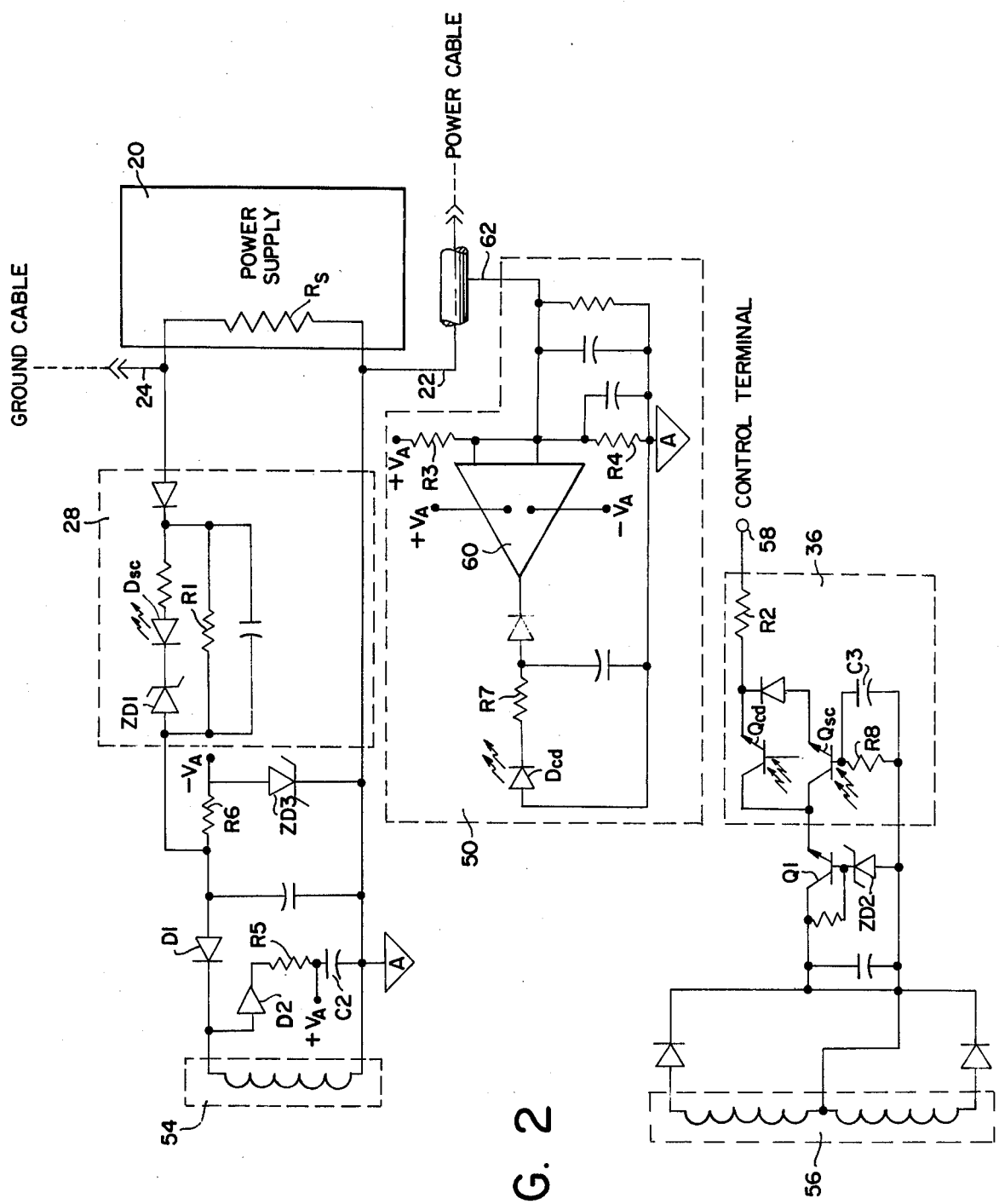
FIG. 2 is a schematic circuit diagram of one embodiment of the touchwork system of the present invention.

FIG. 2 illustrates a detailed circuit diagram of one embodiment of the touchwork system of the present invention. As shown, the output current signal from a 12 volt AC supply 54 (e.g., a voltage tap across the secondary winding of an AC transformer) is rectified by diode D1 and is fed through a resistor R1 and the shunt resistor $R_s$, bypassing the zener diode ZD1 and the light emitting diode $D_{sc}$ connected in parallel across resistor R1. The diode $D_{sc}$ is part of a conventional photo-coupler which is packaged together with a transistor $Q_{sc}$. This transistor $Q_{sc}$ constitutes part of the control circuit 36. The values of the resistors R1 and $R_s$ are chosen such that the voltage drop across each resistor is approximately one half of the 12 VAC supply 54, i.e. about 6–8 volts. A sensor voltage of the same magnitude also appears across the consumable wire 12 and the workpiece W.

At the instant of time when the consumable wire 12 touches the workpiece W, the shunt resistor $R_s$ is short circuited and the full 12 volts from the 12 volt AC supply 54 appears across the resistor R1 and also across the parallel connected zener diode ZD1 and the light emitting diode $D_{sc}$. This voltage change which occurs in the sensing circuit 28 causes the voltage across the zener diode ZD1 to increase and exceed its threshold voltage whereupon the zener diode ZD1 begins to conduct current which is then passed through diode $D_{sc}$ of the photocoupler.

The passage of current through diode $D_{sc}$ causes the transistor $Q_{sc}$ in control circuit 36 to turn on and allow a current signal to pass from a 12 volt AC supply 56. This signal passes through the collector-emitter path of transistor Q1 whose base is controlled by zener diode ZD2 and then through the collector-emitter path of the transistor $Q_{sc}$. The signal from transistor $Q_{sc}$ is limited by resistor R2 and applied to a control terminal 58. This signal is then passed to the welding contactor 40 which closes and produces in turn the output signal 42 which turns on the power supply 20.

Welding current begins to flow through the cable leads 22, 24 when the arc is established between the consumable wire 12 and the workpiece W. When the arc voltage develops across the power supply 20, zener diode ZD1 turns off and the current ceases to flow through the light emitting diode $D_{sc}$. This in turn turns off the transistor $Q_{sc}$ and terminates the signal at the control terminal 58. The welding current that begins to flow when the arc strikes is detected by the current detector circuit 50. Detector circuit 50 may be any conventional current detecting device but preferably is an electronic current detector of the type disclosed in U.S. Pat. No. 3,603,846 issued to T. E. Toth on Sept. 7, 1971. As shown, the current detector comprises an operational amplifier 60 having an input 62 connected to the cable lead 22 from the power supply 20. The operational amplifier 60 is of conventional design, operating as a level detector. The reference potential for the operational amplifier 60 is obtained by biasing the amplifier into positive saturation. Resistors R3, R4 form a voltage divider providing the reference potential to the input of the amplifier 60. The positive bias supply into the amplifier 60 is provided through the diode D2, resistor R5 and capacitor C2 which are connected in series across the 12 volt AC supply 54. The negative supply is provided through resistor R6 and the zener diode ZD3. The detector circuit 50 employing the operational amplifier 60 is capable of detecting very small currents as opposed to the conventional mechanical type detectors. When the welding current begins to flow, the detector circuit 50 immediately produces an output signal which is fed through a dropping resistor R7 to the light emitted diode $D_{cd}$. The diode $D_{cd}$ is also part of a conventional photo-coupler which includes the transistor $Q_{cd}$ in the control circuit 36. Transistor $Q_{cd}$ turns on allowing the current signal to continue to flow from the 12 volt AC supply 56, i.e., through the collector-emitter path of control transistor Q1 and then through the collector-emitter path of the transistor $Q_{cd}$ to the control terminal 58. As a result, the welding contactor 40 remains energized, the power supply 20 is maintained in circuit, the motor M continues to drive the wire feeder rolls 10 and the shielding gas continues to flow to the torch T.

The welding process terminates when the operator removes the consumable wire 12 from the workpiece W and breaks the arc. Welding current then ceases to flow in the cable leads 22, 24 from the power supply 20. The output signal from the detector circuit 50 terminates which turns off transistor $Q_{cd}$ and no signal is fed to the control terminal 58. The welding contactor 40 is de-energized and turns off the power supply 20. Motor M ceases to operate the wire feeder rolls 10 and the flow of shielding gas from the gas supply 48 is terminated.

An important feature of the present invention is the provision of a timer in the control circuit 36. This timer is designed to permit the wire feeder rolls 10 to feed out a small quantity of consumable wire 10 from contact tip 16 immediately after the occurrence of wire "blow off" which can happen when the operator first touches the consumable wire 10 to workpiece W during start up. The timer consists of an RC network including resistor R8 and capacitor C3, connected to the base of the transistor $Q_{sc}$. The RC time constant of this network is such that transistor $Q_{sc}$ is maintained forward biased for a short predetermined time period after termination of the signal feed from diode $D_{sc}$ in sensing circuit 28. Thus, when blow-off occurs, transistor $Q_{sc}$ will continue to conduct and pass the signal from the 12 volt AC supply 56 to the control terminal 58. The short predetermined time period set by the RC network is sufficient to keep motor M energized just long enough for the wire feeder roles 10 to feed out the necessary length of consumable wire 12. There is therefore no need for the operator to go back to the wire feeder rolls 10 and manually feed out the additional wire through contact tip 16 to begin a fresh start.

Although the present invention has been described herein in connection with specific circuitry as shown and described, it will be apparent that many modifications may be made by those skilled in the art without departing from the spirit and scope of the invention. One such modification may be for example the use of other types of current detector devices such as those based on the use of a magnetic coil surrounding the cable lead to detect current flow magnetically.

What is claimed is:

1. A touchwork system for use in a consumable metal inert gas arc welding apparatus including a torch having a gas inlet, a DC power supply, means for feeding a consumable wire electrode through said torch including a drive motor and a supply of shielding gas, said touchwork system comprising, in combination:

a sensing circuit means including a low voltage power source connected across said consumable wire electrode and the workpiece and a first light-emitting diode connected in series with said power source for producing an optical signal in response to the touch of said consumable wire electrode to the workpiece;

a current detector circuit including means for detecting the flow of welding current from the DC power supply when an arc is established between said consumable wire electrode and the workpiece and a second light-emitting diode connected to the output of said detecting means for producing an optical signal in response to the flow of welding current from said DC power supply;

a control circuit including a current source connected in series with a first photosensitive transistor which is coupled to said first light-emitting diode and adapted to receive the optical signal therefrom and in series with a second photo-sensitive transistor which is coupled to said second light-emitting diode and adapted to receive the optical signal therefrom, the arrangement being such that said first photo-sensitive transistor conducts current from said current source when said consumable wire electrode first touches the workpiece to initiate a control signal and said second photo-sensitive transistor conducts current from said current source as soon as the flow of welding current is detected to maintain the control signal, the control signal connecting said DC power supply with said torch and the workpiece while energizing said drive motor and controlling the flow of shielding gas to said gas inlet from said gas supply.

2. A touchwork system in accordance with claim 1 wherein said sensing means includes a zener diode connected in series with said first light-emitting diode, the threshold voltage of said zener diode being such that said zener diode conducts and passes current through said first light-emitting diode at the instant of time when a short circuit appears across said sensing means upon touch of said consumable wire electrode to said workpiece.

3. A touchwork system in accordance with claim 1 wherein said means for detecting the flow of welding current includes an operational amplifier having an input connected in series between said DC power supply and said torch and wherein said second light-emitting diode is connected to the output of said operational amplifier, said amplifier being adapted to pass a current signal through said second light-emitting diode upon detection of welding current.

4. A touchwork system in accordance with claim 1 wherein an RC network is connected to the base of said second photo-sensitive transistor, the RC constant being such that said second photo-sensitive transistor will continue to conduct for a short predetermined time period in the absence of the optical signal from said second light-emitting diode which is caused by blow-off of said consumable wire electrode during start-up, said RC network permitting said wire feeder means to pass additional consumable wire electrode through said torch.

* * * * *

UNITED STATES PATENT OFFICE
CERTIFICATE OF CORRECTION

Patent No. 4,079,231  Dated March 14, 1978

Inventor(s) T. E. Toth

It is certified that error appears in the above-identified patent and that said Letters Patent are hereby corrected as shown below:

In the Specification

Column 3, line 47 (application serial no. 672,076, page 7, lines 20 and 21) "photocoupler" --photo-coupler--.

In the Drawing

Figure 1, the reference letter "W" should be present with lead line into block below consumable wire "stick out" at 18.

Signed and Sealed this

Twenty-eighth Day of November 1978

[SEAL]

Attest:

RUTH C. MASON
Attesting Officer

DONALD W. BANNER
Commissioner of Patents and Trademarks